United States Patent [19]

Asioli

[11] 4,079,866
[45] Mar. 21, 1978

[54] LUBRICANT METERING VALVE IN LUBRICATING SYSTEMS

[76] Inventor: Zeo Asioli, Via Fosdondo, 54, Reggio Emilia, Italy

[21] Appl. No.: 738,967

[22] Filed: Nov. 4, 1976

[30] Foreign Application Priority Data

Nov. 10, 1975 Italy .................. 42533A/75

[51] Int. Cl.² ............................. F16N 7/14
[52] U.S. Cl. ................... 222/335; 184/7 E
[58] Field of Search ........... 222/335, 340, 494; 184/7 D, 7 E

[56] References Cited

U.S. PATENT DOCUMENTS 3,715,013  2/1973  Lyth et al. ............ 184/7 E

Primary Examiner—Stanley H. Tollberg
Attorney, Agent, or Firm—Browdy and Neimark

[57] ABSTRACT

A lubricating metering valve having an inlet chamber followed by a cylindrical chamber for discharge of the lubricant, a longitudinal tubular element being capable of permitting the refilling of the lower section of the discharge chamber, the element having a flange with openings therethrough to permit flow of lubricant and a longitudinal hole through the element, a sliding ring around the tubular element coupled with a lubricant discharge bushing located externally of the cylindrical wall of the tubular element, a coil spring actuating the discharge bushing upwardly, openings in the lower wall of the tubular element to permit flow into the discharge chamber, the holes being adapted to be closed by the bushing at the end of its downward stroke, a distributor-shutter element adapted for axial movement and located at the top of the valve, at its lower end the shutter element narrowing by two opposing truncated cones with a longitudinal hole adapted to be sealed by a rubber seal ring which prevents flow of lubricant during the feed stage.

3 Claims, 2 Drawing Figures

LUBRICANT METERING VALVE IN LUBRICATING SYSTEMS

FIELD OF THE INVENTION

This invention relates to a lubricant metering valve for use in lubricating systems. The valve can be inserted into the pipe end of a lubricating system which dispenses the lubricant, for example oil or fluid grease, coming under pressure from a pump, generally by means of a flow regulating valve. The metering valve is designed for running periodically, to directly or indirectly permit flow of a pre-established quantity of lubricant for each automatic or semiautomatic lubricating cycle into the parts to be lubricated. The lubricating systems which can make use of this valve include industrial motor vehicles, machine tools and machines and equipment in general. The technical characteristics of the lubricant such as viscosity and density, may be at will.

BACKGROUND OF THE INVENTION

Before this invention there were substantially two types of metering valves. A first type is made up of a valve including a cylindrical inlet chamber equipped with a piston here inserted with clearance, the piston itself being pushed toward the lubricant inlet by a coil spring inserted downstream around the rod with which the piston is provided in order to close, by the downstream end of the rod itself, the narrowing portion through which the lubricant passes into the subsequent discharge chamber. In the discharge chamber there is contained a substantially truncated-conical rubber shutter with its stem downstream, to be guided and pushed against a truncated-conical seat of the above-mentioned narrowing portion by a conical coil spring inserted in the outlet area of the chamber itself.

A second type of metering valve has been provided, in its cylindrical inlet chamber, with an elastic rubber shutter shaped like a truncated-conical mushroom sliding in the chamber itself, the downstream end of its stem is destined to close the longitudinal hole inlet of a tubular element guided at the bottom and resting against the outlet narrowing portion of the cylindrical discharge chamber; said tubular element being equipped upstream with an external flange to be fixed in the center of the discharge chamber even if it lets the lubricant pass through the flange and the chamber themselves. This same tubular element is provided at its downstream end with a couple of notches in order to allow its longitudinal hole to communicate with the surrounding discharge chamber, wherein there is inserted a coil spring which pushes upstream a metering bushing coaxially slidably coupled, on the inside with the external surface of said tubular element end, and on the outside, by means of a flange located on the opposite side of the spring, with the cylindrical surface of the discharge chamber. Upstream of the metering bushing a sliding rubber ring is placed to seal the lubricant downstream of the flange of said tubular element, between said tubular element and said cylindrical discharge chamber surface.

SUMMARY OF THE INVENTION

These prior art valves involve the same defects and drawbacks. As far as the first type of valve is concerned, should a very fluid lubricant be used, according to the calibration of the two springs and to the speed of the lubricant itself, it may happen that the lubricant goes through the annular space existing between the piston and the inlet chamber without dragging the piston itself to close, by its rod end, the separation narrowing between the inlet chamber and the discharge one, continuing, therefore, its way in order to meet the truncated-conical rubber shutter element, pushing it downstream and thereby making possible a continuous and uncontrolled discharge. This involves damages arising from the lubricant waste and also from the overheating which may be caused to certain parts such as bearings by the lubricant excess.

As far as the second type of valve is concerned, when there is an elevated pressure, particularly with poorly fluid lubricant, the elastic rubber shutter having the form of a truncated-conical mushroom, whose peripheral edge is necessarily thin to allow the elastic contraction necessary to let the lubricant pass around said edge from one chamber into another, and whose stem, with a diameter smaller than that of said edge and therefore weak, submitted to the lubricant thrust and to the closing stress, cannot resist for a long time without squashing and becoming mushy, with the serious drawback of a more or less rapid lubricant flow stop, or vice versa, of a continuous lubricant flow: All this involves economic damages and impairs the good functioning and the life of the parts to be lubricated. The first type of metering valve having to be constituted and/or calibrated with different characteristics according to the type of lubricant used, while the use of the second type of valve is limited to relatively low pressure bands.

Such defects and drawbacks make it necessary to solve the new technical problem by finding a metering valve whose shutter organ guarantees a perfect lubricant flow interruption between the inlet chamber and the discharge chamber during the feed stage, guaranteeing besides the impossibility for the lubricant flow to backflow from the discharge chamber into the inlet chamber when the feed itself stops; said shutter part having to last for a long time, without any danger of permanent deformations of squashing; such a valve having to allow, without introducing any change and without changes of calibration, the application for a vast pressure range, e.g. from few atmospheres to 100 or more atmospheres and the use of any type of lubricant, from the most fluid to the least fluid, generally used. All this must be done without presenting any change of its seal performance in both senses, ensuring therefore a steady metering.

The present invention solves completely, principally, the above-mentioned technical problem by using a metering valve wherein the device located in the upper section and in the lower section of the lubricant discharge chamber, referred to in the second type of traditional valve, is unchanged, except for the introduction, in the chamber obtained in the end flange of the tubular element, of an elastic seal ring at the top partially protruding from the chamber itself.

The cylindrical lubricant inlet chamber is coupled, by axial sliding, instead of the above-mentioned elastic rubber shutter shaped like a truncated-conical mushroom with rod downstream and referred to in the second type of traditional valve, a distributor-shutter element having on the upper part a cylindrical body, on the lower part having a narrowing formed by two opposing truncated cones joined by the lower or smaller base in correspondence with the narrowing itself, the larger base of the first truncated cone being represented by the smaller base of said cylindrical body and the base of the second, having a diameter smaller than the larger base of said first truncated cone, being destined to come into contact with said elastic seal ring inserted in said chamber of the swelling of said tubular element communicating with the longitudinal hole of the element itself. The double seal distributor-shutter element is provided, from upstream (or from above referring to the subsequent figures) with a longitudinal bore which ends more or less into the narrowing area made up by said two opposing truncated cones, where it branches out into two radial holes, the lubricant outflow from said two radial holes being opposed by an elastic seal ring inserted into the annular groove formed by the bitruncated-conical narrowing.

BRIEF DESCRIPTION OF THE DRAWINGS

An embodiment of this invention is illustrated, as a pure illustration, in the schematic drawing enclosed, wherein.

DESCRIPTION OF PREFERRED EMBODIMENTS

Figure 1:
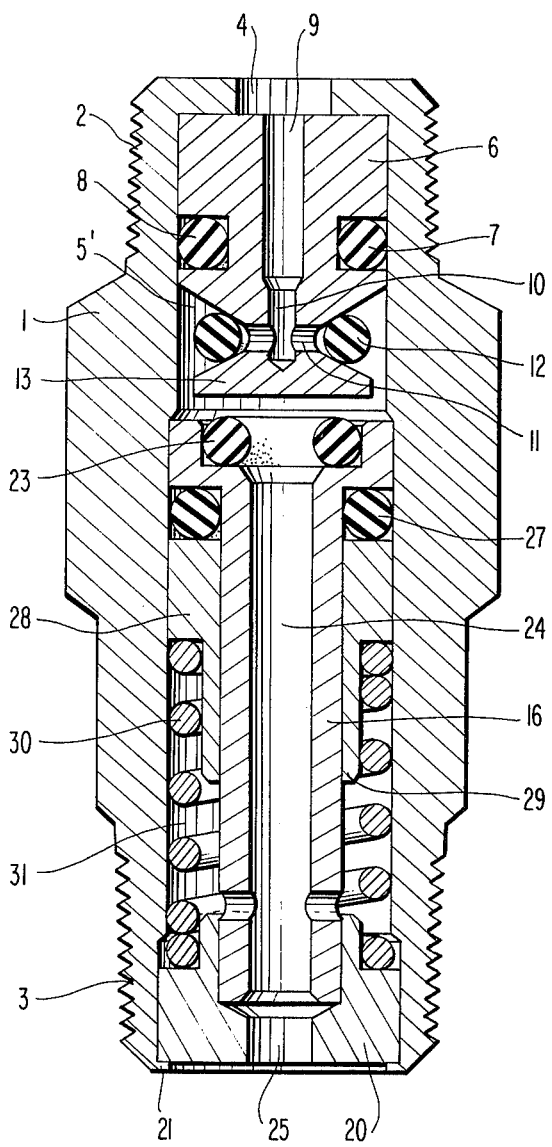
FIG. 1 is an enlarged longitudinal sectional view of the metering valve while resting after the refill stage.

Referring to these figures, the valve body 1 is provided with an outer thread 2 at one end thereof for attachment to the feeding pipe, not illustrated and with an outer thread 3 at the outer end thereof for the possible insertion of a pipe for indirect lubrication or for the direct assembly in the body of the organ to be lubricated. An inlet hole 4 is provided communicating with the upper part 5 of the cylindrical inlet chamber wherein is inserted a double-seal distributor-shutter element made up of a cylindrical body 6 coupled by axial sliding with the cylindrical surface of said inlet chamber indicated, in its lower section, by 5'. A rubber seal ring 7 is introduced into a groove 8 of the body 6. An axial inlet hole 9 of body 6, has a narrowing 10 in order to increase the resistance when the lubricant flows. A couple of radial holes 11 distribute the lubricant to the chamber section 5 downstream of body 6, around the rubber ring 12, which is inserted into the V groove obtained between the body 6 and its downstream appendix 13. The appendix 13 is of smaller diameter due to the narrowing of the outer diameter of the opposing truncated cone. The pressure of the lubricant contained in holes 9-10-11 is applied to the ring 12 causing it to extend permitting the lubricant itself to flow, through lateral passages 14, into the upper section 15 of the discharge chamber. A tubular element 16 has an upstream annular flange 17 coupled with the cylindrical wall of the upper section 15 of the discharge chamber, provided with peripheral flattenings 18, at the top resting against narrowing chamfer 19 thus dividing chamber 5' and 15. The tubular element 16 rests at the bottom against body 1 through support and centering element 20 which is held by the edge flange 21 of body 1. A chamber 22 located in flange 17, contains a rubber ring 23 at the top protruding from the chamber itself to seal against the lower face of appendix 13. A longitudinal hole 24 within tubular element 16, extends into discharge hole 25 of element 20 at the bottom. A couple of radial holes 26 in tubular element 16, communicate with the upper discharge chamber section 15. An elastic seal ring 27 is inserted between the lower face of flange 17 and the upper face of an annular flange 28 of bushing 29 which is slidably coupled with the tubular element 16 and the upper section 15 of the discharge chamber through flange 28. A coil spring 30 is compressed between an upper face of element 20 and the lower face of flange 28 of bushing 29 in the lower discharge chamber section.

The operation of the valve is as follows: during the feed stage, the lubricant coming under pressure into hole 4 passes into holes 9-10-11, finding here the elastic resistance of ring 12. Firstly, until a pressure value of some atmospheres is reached, the flow of lubricant is stopped, thus causing the downstream shifting of element 6 until it occludes chamber 22, with the downstream face of its appendix 13, by compression contact on ring 23. Then, the lubricant, because of the increased pressure, will force elastic ring 12, permitting flow through holes 11, through lateral passages 14, into discharge chamber 15 wherein it causes the shifting downwardly of the elastic seal ring 27 and of underlaying bushing 29 which compresses spring 30. It is thus seen that the whole valve is full of lubricant in every part, and then the lubricant contained in chamber 31 is expelled by the downward movement of bushing 29 through holes 26 into the outlet 25. The amount of lubricant expelled through outlet 25 is defined by the free volume of chamber 31.

Figure 2:
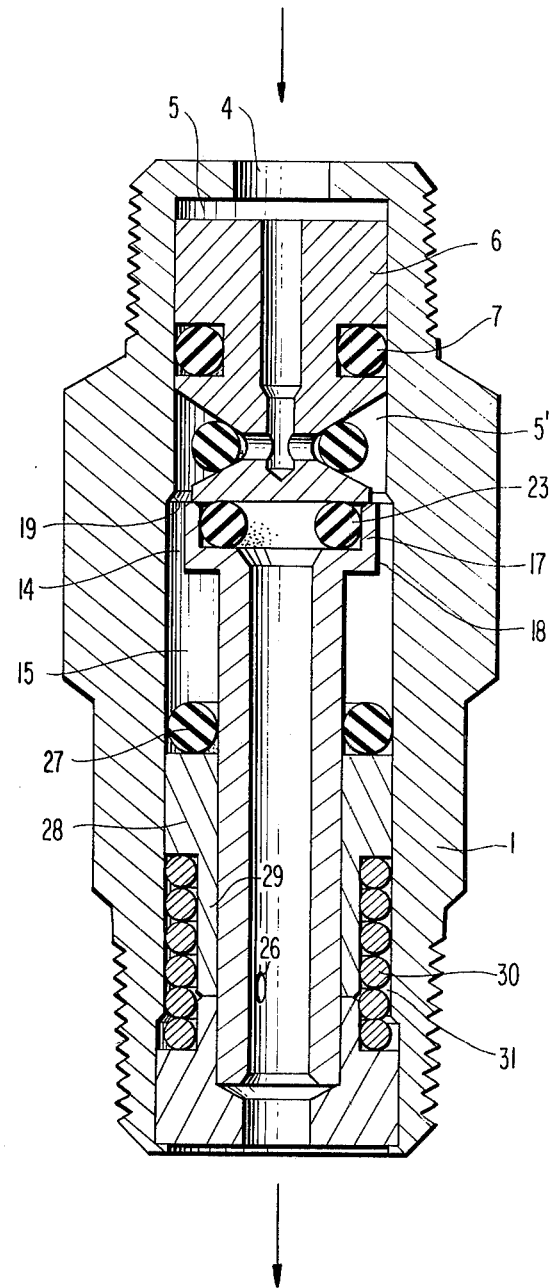
FIG. 2 is a sectional view similar to that of FIG. 1, but relevant to the discharge stroke wherein the tubular element is resting with its end downstream against the discharge chamber narrowing and is rotated by 45° in the counterclockwise sense direction in order to point out the flange form upstream of the element itself, suitable for letting the lubricant flow pass.

Once the lubricant discharge flow has stopped because of the stopping of the lower end of bushing 29 against the upper face of element 20, followed by the occlusion of holes 26, the elastic ring 12 resumes its initial position of smaller diameter closing the bitruncated-conical narrowing wherein it is inserted. In such a situation (FIG. 2) the flow of the lubricant towards outlet 25 is perfectly sealed by the valve in particular because of seal rings 7 and 23. Thus, in order that the lubricating cycle be repetitive, the valve must return to the position as shown in FIG. 1, by annulling the feed pressure; once this pressure had been annulled in 4-5-9-10-11 spring 30 pushes the bushing 29 upwardly thus causing the body 6–13 to go up again to the upper limit of chamber 5 thereby detaching the lower face of appendix 13 from the upper face of ring 23. This causes the expulsion of the lubricant contained in upper section 15 of the discharge chamber through passages 14 toward chamber 22 and from here into hole 24 which is already full. From here the lubricant flows through holes 26, and fills the lower section 31 of the discharge chamber because of the depression in the chamber which has occurred after the upward movement of the bushing 29. A part of the lubricant discharged from 15, which exceeds the capacity of chamber 31, accumulates into upper chamber 5' to compensate for the volume 5 (FIG. 2). In this latter situation (FIG. 1) the valve perfectly seals the lubricant toward inlet 4 because of seal rings 7 and 12.

As a practical matter, the execution details, dimensions, materials, and form of the valve can vary without going out of its legal domain. In fact, the disclosure thus realized, is susceptible of changes and variations, all of them included within the scope of the inventive concept. Moreover, all the elements can be replaced by other technically equivalent elements.

What is claimed is:

1. A lubricant metering valve for use in lubricating systems, comprising a body for insertion onto the end of a dispersing pipe for the lubricant under pressure, said body including a cylindrical inlet chamber for the lubricant to be proportioned, followed by a cylindrical chamber for direct or indirect discharge of the lubricant itself for doses to the parts to be lubricated, in said discharge chamber is inserted a longitudinal tubular element fixed between a narrowing chamfer existing between said discharge chamber and said inlet chamber and a limitation element narrowing downstream of the discharge chamber, said tubular element being capable of permitting the refill of the lower section of said discharge chamber, said tubular element being equipped at its upstream end with a centering flange in the upper section of the discharge chamber, said flange being externally provided with flattened portions in order to permit the flow of lubricant, internally equipped with a chamber communicating with the longitudinal hole of the tubular element itself, a sliding ring being inserted around said tubular element, downstream of said flange, resting on the upstream face of the flange of a lubricant discharge bushing coupled by sliding between the cylindrical discharge chamber wall and the external cylindrical wall of said tubular element, a coil spring located in the lower section of said discharge chamber compressed between the downstream face of said flange and an upper face of said limitation and narrowing element, openings in the lower section of said tubular element to permit communication between said longitudinal hole and the lower section of said discharge chamber, said openings being adapted to be closed by said discharge bushing at the end of its lubricant expulsion stroke said metering valve being equipped in said lubricant inlet chamber, with a distributor-shutter element formed by a body cylindrical at the top and coupled by axial sliding with said inlet chamber, provided with a rubber seal ring in a peripheral annular groove, said body having at its lower end an external narrowing determined by two opposing truncated cones jointed by a smaller base in correspondence with the external narrowing itself, the larger base of the first truncated cone coinciding with the lower base of said cylindrical body and the larger base of the second truncated cone, having a diameter smaller than that of the larger base of the first truncated cone to let the lubricant flow, being adapted to compress the upper face of a rubber seal ring built in said chamber of the longitudinal element flange to prevent the lubricant from flowing through the longitudinal hole of said tubular element during the feed stage.

2. A lubricant metering valve according to claim 1, wherein said distributor-shutter element along its cylindrical body, from its upstream face to the height of said external narrowing, there is an axial hole getting narrower downstream, branching out into two or more radial holes leading into correspondence with the narrowing itself to permit the lubricant flow downstream during the feed stage.

3. A valve according to claim 2, wherein a rubber ring is located in said external narrowing which, while resting, adheres with force to two said opposing truncated cones, so as to prevent the lubricant outlet through said radial holes when the lubricant itself has not reached the pressure value necessary to overcome the resistance of said ring.

* * * * *